(No Model.) 5 Sheets—Sheet 2.
J. COUP.
CAR COUPLING.
No. 361,209. Patented Apr. 12, 1887.
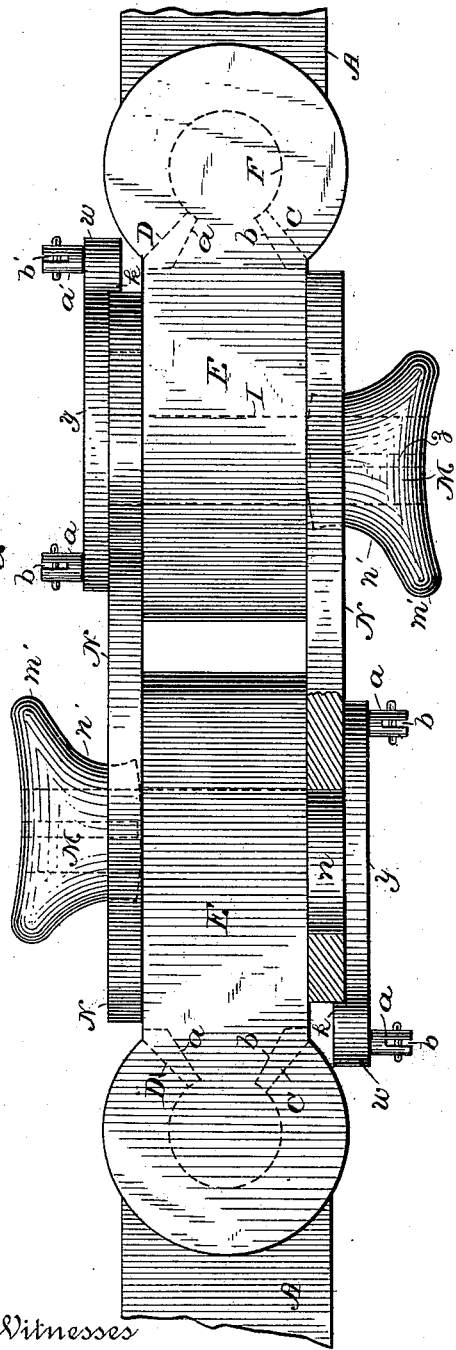
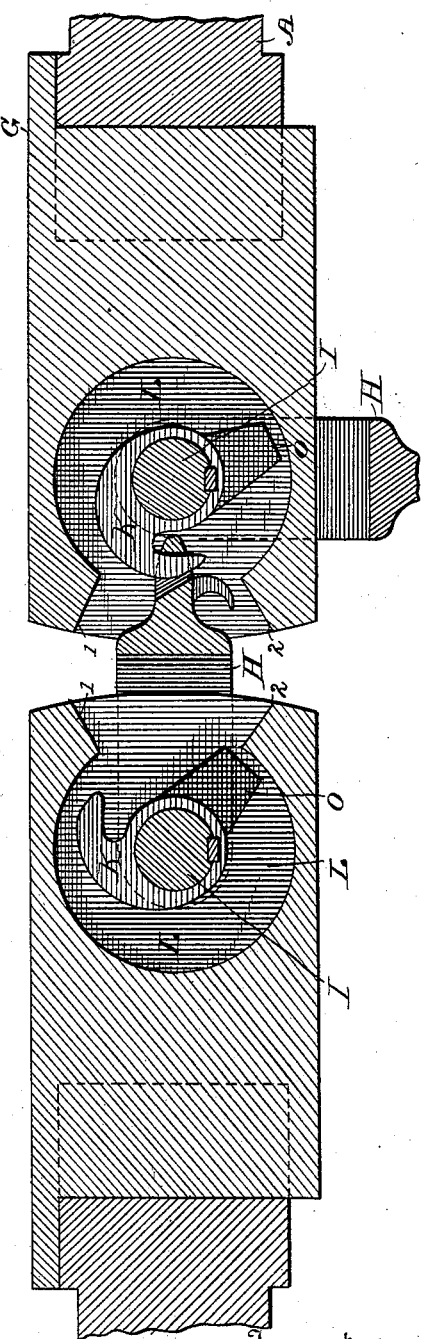
Witnesses
Inventor
J. Coup
By his Attorneys (No Model.) 5 Sheets—Sheet 3.
J. COUP.
CAR COUPLING.
No. 361,209. Patented Apr. 12, 1887.
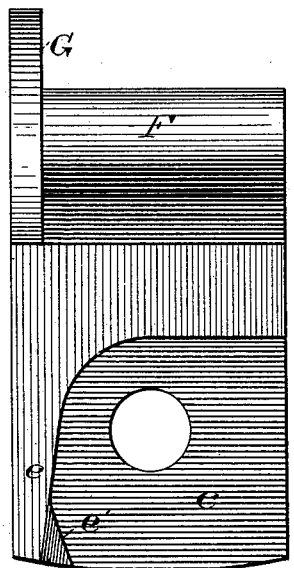
Fig. 5.
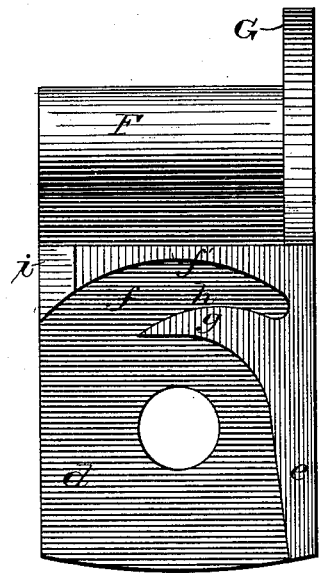
Fig. 4.
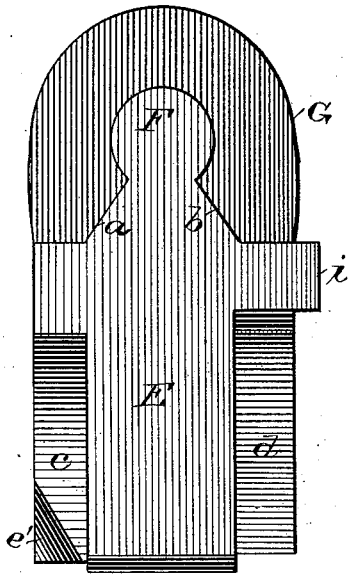
Fig. 6.
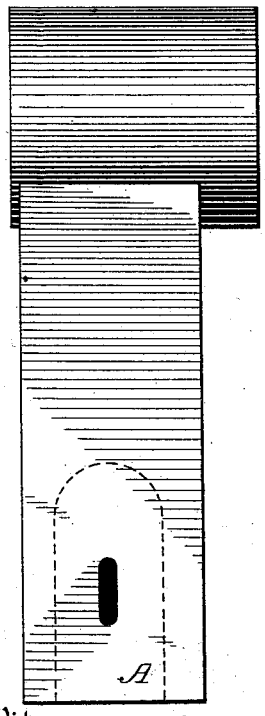
Fig. 7.
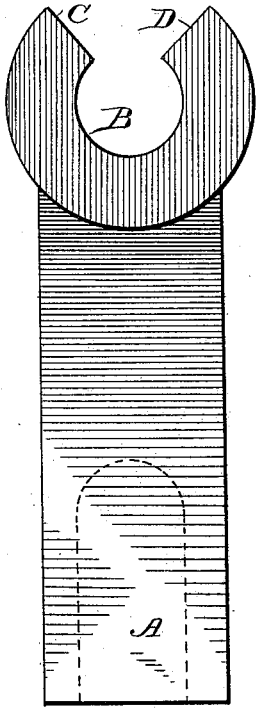
Fig. 8.
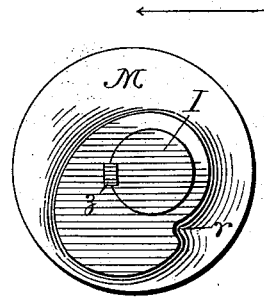
Fig. 9.
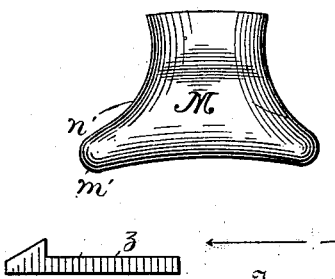
Witnesses
Wm. J. Tanner
Jno. E. Dyre.
Inventor
J. Coup
By his Attorneys
Johnston, Reinohl & Dyre (No Model.) 5 Sheets—Sheet 4.

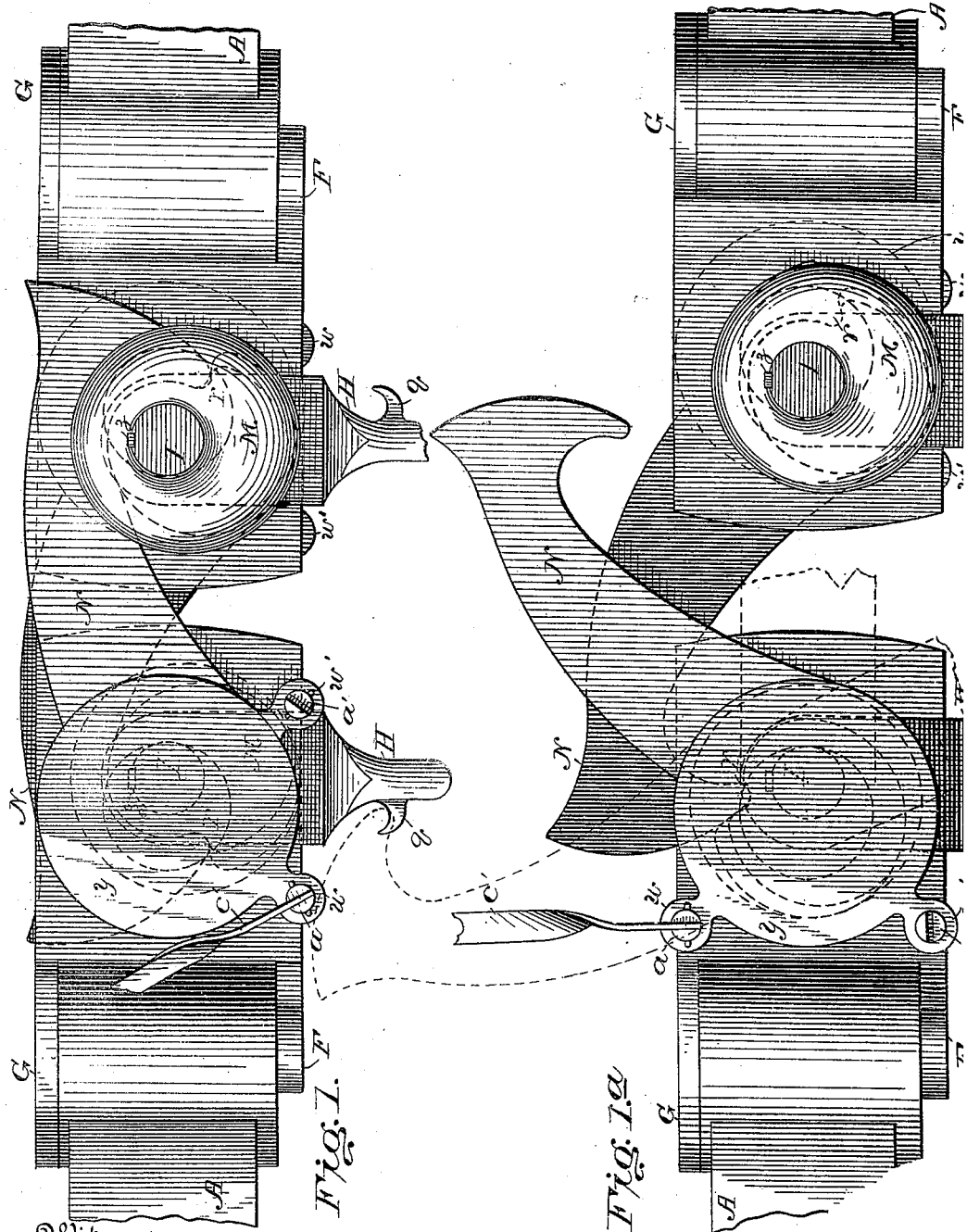

J. COUP.
CAR COUPLING.

No. 361,209. Patented Apr. 12, 1887.

Witnesses
Wm. J. Danner
Wm. E. Dye

Inventor
J. Coup
By his Attorneys
Johnston, Reinohl & Dye (No Model.) 5 Sheets—Sheet 5.

J. COUP.
CAR COUPLING.

No. 361,209. Patented Apr. 12, 1887.

Witnesses
Inventor
J. Coup
By his Attorneys
Johnston, Rinohl & Dyre

UNITED STATES PATENT OFFICE.

JOHN COUP, OF NEW YORK, N. Y., ASSIGNOR OF ONE-EIGHTH TO ELIZABETH M. CARRINGTON, OF SAME PLACE.

CAR-COUPLING.

SPECIFICATION forming part of Letters Patent No. 361,209, dated April 12, 1887.

Application filed March 3, 1887. Serial No. 229,589. (No model.)

*To all whom it may concern:*

Be it known that I, JOHN COUP, a citizen of the United States, residing at New York, in the county of New York and State of New York, have invented certain new and useful Improvements in Automatic Car-Couplings; and I do hereby declare the following to be a full, clear, and exact description of the invention, such as will enable others skilled in the art to which it appertains to make and use the same.

This invention relates to automatic car-couplings, and has for its object the construction of a coupling which will automatically engage with a corresponding coupling, or may be engaged with any of the standard couplings in use.

The invention is designed as an improvement on the style of couplings known as the "Coup Coupling," and has special reference to improvements in the coupling shown in my application for patents, Serial Nos. 188,180, filed January 11, 1886, and 214,338, filed September 23, 1886.

The invention will be hereinafter described, and particularly pointed out in the claims.

Figure 10:
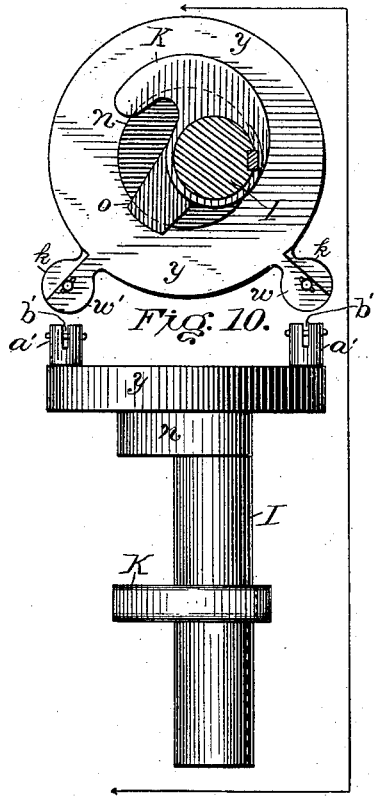
Figure 11:
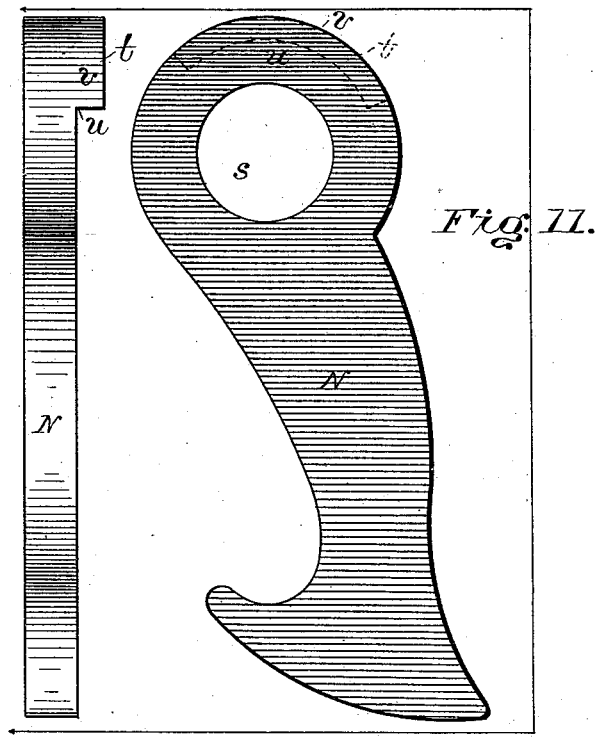
Figures 12, 13:
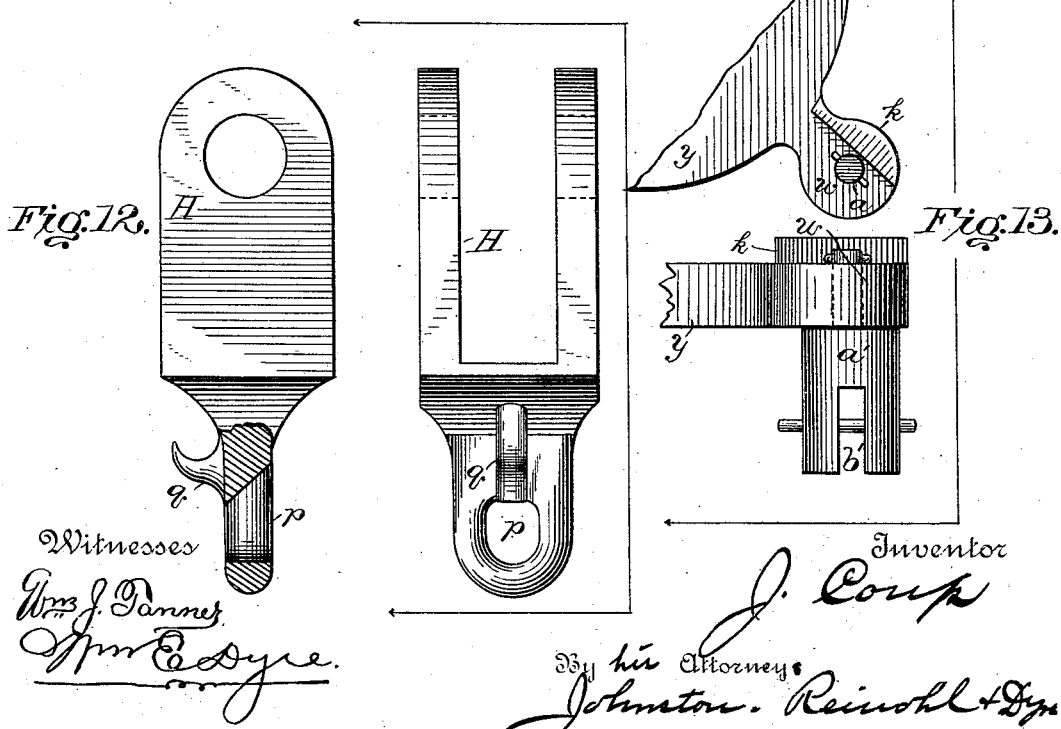
Figure 14:
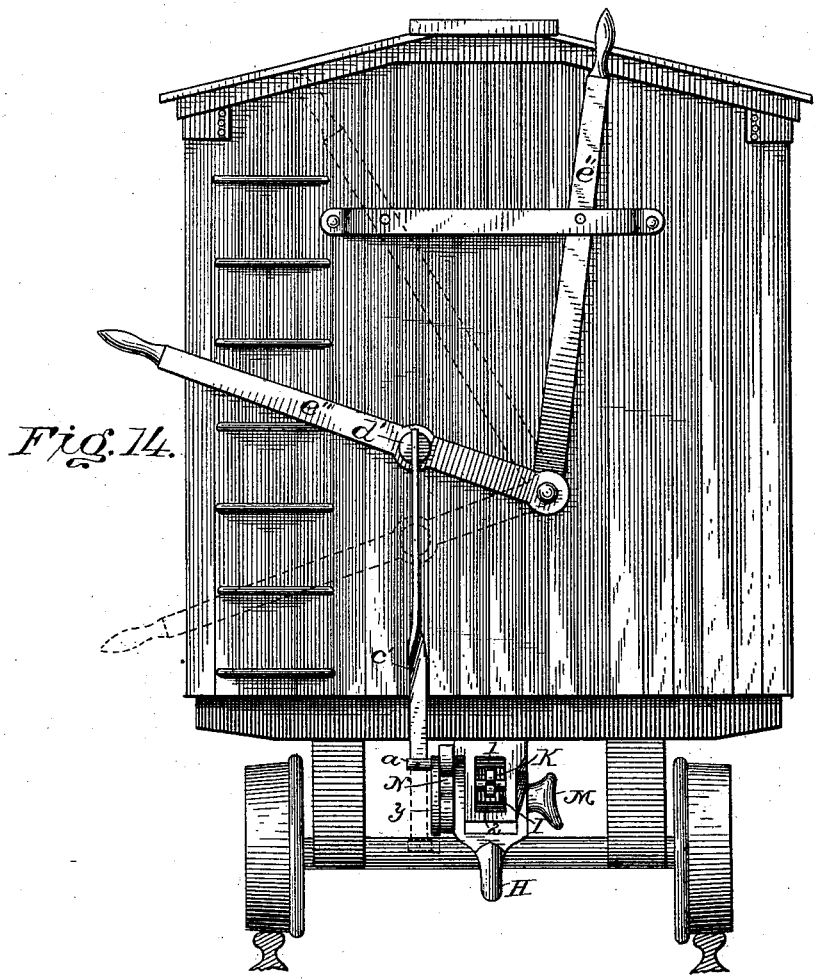
Figure 15:
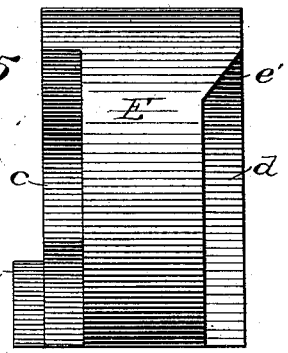
Figure 16:
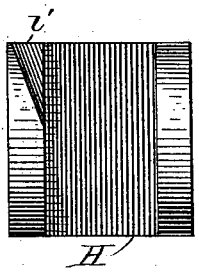

In the accompanying drawings, which form a part of this specification, Figure 1 represents a side elevation with the parts coupled. Fig. 1ª is a similar view with the parts uncoupled; Fig. 2, a plan; Fig. 3, a longitudinal section. Fig. 4 is a side view of the front section of a draw-head. Fig. 5 is a similar view of the opposite side of said head. Fig. 6 is an inverted plan view of the same. Fig. 7 is a side view of the rear section of the draw-head. Fig. 8 is a plan thereof. Fig. 9 represents an end and top view of the pallet-shaped cam; Fig. 10, an end view and a side view of the transverse assembling-pin; Fig. 11, a side and edge view of the hook. Fig. 12 is a side and inverted plan view of the link. Fig. 13 is a detail of the connection for operating the hooks. Fig. 14 is an end view of a car with coupling attached and means for operating the same. Fig. 15 is a front end view of a solid front section of a draw-head, and Fig. 16 is a rear end view of the link.

Reference being had to the drawings and the letters marked thereon, A represents the rear section of a draw-head, which is provided with a vertical cylindrical cavity, B, in its front end and cut away to form the angular walls C D, which are cut at about thirty-two (32) degrees.

E represents the front section of the draw-head, which has a chamber, L, formed in it, having an inclined upper and lower wall, as shown at 1 2 in Figs. 3 and 14, and is provided with a cylindrical pin, F, over which extends a cap or flange, G, for preventing ice, snow, or other foreign matter from getting into the knuckle-joint formed by the intersecting members of the draw-head. The walls *a b* are formed at an angle of about twenty-two (22) degrees, to allow sufficient space between them and the walls C D of section A to afford sufficient lateral movement of the cars in rounding curves in the road.

On both sides of the front end of the section E are recesses *c d*, to receive the rear ends of the link H. The upper walls, *e*, of the recesses *c d* are formed at an angle of about forty-five (45) degrees, to limit the upward throw of said link, and the front end of said wall is inclined, as shown at *e'*, to prevent the hook from catching on the same. On one side of said head is also formed a recess or housing, *f*, the rear wall, *f'*, of which describes a segment of a circle struck from the center of the eccentric cam on the transverse assembling-pin. The front wall, *g*, of said recess *f* is also curved, as shown at *h*. It will also be observed that the recess *f* is converging, the widest point being at the lower or open end of the recess. On the lower portion of the rear wall of said recess is a projection, *i*, which engages with a shoulder, *k*, on the inner surface of the arm of the disk on the assembling-pin.

I represents the assembling-pin, upon one end of which is formed a disk, *y*, from which project arms *w w'*. On the inner face of said disk is formed a cam, *n*, which is eccentric to the pin I, and upon which the eye *s* in the coupling-hook fits. Upon said pin I is mounted a hook or dog, K, which has a projection, *o*, formed thereon, to be struck by the link of an adjacent car as the cars approach each other, to throw the hook forward and in engagement with said link automatically.

H represents a link, also mounted upon the pin I, the arms of which project into the recesses *c d* on the sides of the section E of the draw-head, and in the front end of the link is formed an eye, $p$, and on the under side of the link is formed a hook, $q$, for engagement with a link of an adjacent car. The inner upper edge of one arm of each link is chamfered at $i'$, to correspond with the incline $e'$ on the wall $e$ of the section E.

On the end of the pin I is mounted a pallet-shaped cam, M, the longest side of whose flange $m'$ projects forward and is flared outward, as shown at $n'$. The cam is provided with a recess, $r$, with which the bill or the point of the hook engages. The point of the hook engages the cam M below the center of the transverse pin I.

The cam is set upon the pin in such a position that when the parts are coupled the longest side of the cam is below the pin, as shown in Figs. 1 and 1ª, and is secured by a key, $z$.

By flaring the front end of the pallet-shaped cam outward the hook will be guided into position, and the coupling may be effected while the cars are rounding a curve in the track; and by setting the cam upon the pin in such position that the longest side of the eccentric is below the shaft the draft on the hooks will pull downward and prevent the cam from turning and releasing the hooks until they are raised positively by mechanical means.

N represents the coupling-hook, in the rear end of which is formed a cylindrical eye, $s$, and on the inner surface of the hook is formed a lateral projection, $t$. The inner surface, $u$, and the outer surface, $v$, of the projection are concentric to the eye $s$ of the hook, and engage, respectively, with the rear and front walls, $f'$ and $g$, of the recess $f$ in the side of the section E of the draw-head. The upper end of the projection $t$ engages with the corresponding end of the recess $f$, and forms a support for the hook N when in a horizontal position and ready for coupling with another car. The lower end of the projection strikes the link H and raises it into position for coupling with a car that is not provided with my automatic coupling, but with any other standard link-coupling. The several positions of the link H are shown in dotted lines in Fig. 1ª.

From the arms $w\ w'$ of the disk $y$ on the pin I project studs $a'$, which are secured in said arms, so that they will rotate upon their axis, and in the outer end of the studs is formed a slot, $b'$, in which a link, $c'$, is pivotally secured. The link $c'$ is twisted and engages at its opposite end with a similar stud, $d'$, pivotally secured to the bell-crank lever $e'$, for operating the coupling either from the side or top of the car.

Should it be desired to connect the couplings with the cab of the engine, a rod or rods may be extended along under the cars from one end to the other of the train and be connected to the arm $w'$.

Instead of forming the chamber L in the section E, said section may be made solid, as shown in Fig. 15. The several parts of the coupling being constructed substantially as described, the operation is as follows: The hooks M being in engagement with the pallet-shaped cams M and the cars coupled, they may be uncoupled by drawing upon the lever $e'$, which will turn the pallet-shaped cam forward, and at the same time raise the hook from engagement with the cam on the adjacent car, as shown in Fig. 1ª.

The couplings having been released, the elevated hook will fall by gravity to its normal position for recoupling. The hook may, however, be held in its elevated position by securing the lever in any well-known manner when the automatic coupling of the cars is not desired, (as in yard use.) When the hook is in this elevated position, the inner surface, $u$, of the lateral projection $t$ on the hook engages with the front wall, $g$, of the recess $f$, and limits the forward throw thereof. This motion of the disk and the assembling-pin puts the hook or dog K in position for automatically coupling with a standard link, as the link will strike the curved front end of the hook, raising it and passing under the same, when it will engage with the eye in the link. When the hook is in its horizontal or coupled position, the rear surface of the projection $t$ engages with the rear curved wall, $f'$, of the recess $f$ and limits the rearward throw of the hook. The knuckle-joint formed by the projection F and the chamber B on the section A and E admits of lateral and vertical adjustment. The projection F on the section E rises and falls in the chamber B, providing for coupling with cars whose draw-bars are of different heights. When the couplings are engaged, sufficient space is allowed between the ends of the draw-heads to allow for the slack required in starting a train, and the connections are so formed that should any one car in the train jump the track or be thrown over an embankment it will immediately release itself from the adjacent cars, either by the knuckle-joint being disengaged or the hooks disengaging from the pallet-shaped cam. It has also been demonstrated that the couplings may be disengaged while the train is under great tension, as in ascending grades or in making flying switches.

The parts constituting the automatic coupling consist of five detachable pieces for a new bar (the front and rear intersecting sections, the transverse pin, the hook, and the cam with which the hook engages) and three pieces for an old or common draw-bar, without the knuckle-joint, the transverse pin, the hook, and the cam.

In the application referred to I have claimed the knuckle-joint, broadly, and a hook having an elliptical projection, in combination with a transverse pin having an operating-wheel on one end.

Having thus fully described my invention, what I claim is—

1. A car-coupling draw-head formed in two detachable sections, the ends of which are provided with intersecting members forming a segmental knuckle-joint admitting of vertical and lateral movement, and a cap or flange covering the joint to protect it, substantially as described.

2. A car-coupling draw-head formed in two detachable sections, the front end of the rear section having a vertical cylindrical chamber and angular faces formed on the extreme end, the rear end of the front section having a cylindrical vertical projection and angular walls adjacent thereto, substantially as and for the purpose set forth.

3. A car-coupling draw-head having recesses on both sides of the front end, said recesses having inclined upper walls, and a recess on one side with curved front and rear walls, in combination with a hook having a lateral projection on the rear end thereof, and a swinging link, substantially as described.

4. A car-coupling draw-head having a recess on one side, and a hook having an eye and a lateral projection thereon, in combination with a transverse pin having a cam and an operating-disk integral therewith, the disk being provided with an operating-arm, substantially as described.

5. A car-coupling draw-head having a recess in one side, in combination with a hook having a lateral projection adapted to said recess, a transverse pin having an eccentric cam thereon, a link, and a dog, substantially as described.

6. A car-coupling draw-head having a chamber formed therein, provided with an inclined lower front wall, a link having a hook on its lower side, and a hook having a lateral projection, in combination with a transverse pin provided with an eccentric cam, and a dog within said chamber, substantially as described.

7. A car-coupling draw-head provided with a transverse pin, in combination with a pallet-shaped cam having an eccentric flaring flange, the long end of which projects forward, and a recess in the periphery of the cam below the center of the pin, substantially as described.

8. A car-coupling draw-head provided with a transverse pin supporting a hook and a cam for engagement with the hook of an adjacent coupling, a disk on one end of said pin having a radial arm or arms, and a projection on one side of said arm, in combination with a projection on one side of the draw-head for limiting the movement of the arm in one direction, substantially as described.

9. A car-coupling draw-head provided with a transverse pin having a disk on one end and supporting a detachable hook and a cam, in combination with slotted studs swiveled in said disk and in an operating-lever, and an intermediate link for connecting the swiveled studs, substantially as described.

In testimony whereof I affix my signature in presence of two witnesses.

JOHN COUP.

Witnesses:
D. C. REINOHL,
CYRUS W. REINOHL.